United States Patent
Muller et al.

(10) Patent No.: US 11,095,596 B2
(45) Date of Patent: Aug. 17, 2021

(54) COGNITIVE REQUEST MANAGEMENT

(71) Applicant: International Business Machines Corporation, Armonk, NY (US)

(72) Inventors: Michael Muller, Cambridge, MA (US); Casey Dugan, Cambridge, MA (US); Aabhas Sharma, Cambridge, MA (US); James Johnson, Cambridge, MA (US); Werner Geyer, Cambridge, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/172,295

(22) Filed: Oct. 26, 2018

(65) Prior Publication Data

US 2020/0137017 A1    Apr. 30, 2020

(51) Int. Cl.
| | | |
|---|---|---|
| *H04L 12/58* | (2006.01) | |
| *H04L 29/08* | (2006.01) | |
| *G06Q 10/10* | (2012.01) | |

(52) U.S. Cl.
CPC ........... *H04L 51/26* (2013.01); *G06Q 10/109* (2013.01); *H04L 51/08* (2013.01); *H04L 51/16* (2013.01); *H04L 51/22* (2013.01); *H04L 67/306* (2013.01); *H04L 67/10* (2013.01)

(58) Field of Classification Search
CPC ....... H04L 51/26; H04L 67/306; H04L 51/08; H04L 67/22; H04L 67/10; G06Q 10/109; G06F 9/542; G06F 9/45558; H04W 4/021; H04W 4/025
See application file for complete search history.

(56) References Cited

U.S. PATENT DOCUMENTS

| | | | |
|---|---|---|---|
| 8,775,951 B2 | 7/2014 | Halliday et al. | |
| 9,460,422 B2 | 10/2016 | Reter et al. | |
| 9,606,977 B2 | 3/2017 | Subramanya et al. | |
| 9,684,627 B1 * | 6/2017 | Sar | G06F 15/00 |
| 2008/0065460 A1 * | 3/2008 | Raynor | G06Q 10/06 705/7.21 |
| 2008/0293392 A1 * | 11/2008 | Strother | H04M 3/5158 455/414.2 |

(Continued)

OTHER PUBLICATIONS

Mel, et al. "The NIST Definition of Cloud Computing". Recommendations of the National Institute of Standards and Technology. Nov. 16, 2015.

(Continued)

*Primary Examiner* — Kamal B Divecha
*Assistant Examiner* — Clifton Houston
(74) *Attorney, Agent, or Firm* — Anthony Curro, Esq.; McGinn I.P. Law Group, PLLC.

(57) ABSTRACT

A cognitive request management method, system, and computer program product include scanning a stream of incoming messages among at least two users to identify a request sent to a first user, storing the identified request in a list of unfulfilled requests, identifying a response of the first user to the request by backtracking within a message thread of the stream of incoming messages and when the response to a request is detected, the request is moved from the user's unfulfilled request list to a list of fulfilled requests, and displaying the list of unfulfilled requests and the list of fulfilled requests.

12 Claims, 4 Drawing Sheets

(56) References Cited

U.S. PATENT DOCUMENTS

| | | | |
|---|---|---|---|
| 2011/0071893 A1* | 3/2011 | Malhotra | G06Q 10/109 705/14.23 |
| 2011/0126123 A1* | 5/2011 | Reter | G06Q 10/109 715/751 |
| 2013/0073634 A1* | 3/2013 | Saiu | G06Q 10/0631 709/206 |
| 2014/0033307 A1* | 1/2014 | Schmidtler | H04L 63/1483 726/22 |
| 2015/0026061 A1* | 1/2015 | Siegel | G06Q 20/4016 705/44 |
| 2015/0121386 A1* | 4/2015 | Marseille | G06Q 10/109 718/103 |
| 2015/0169696 A1* | 6/2015 | Krishnappa | G06F 16/27 707/722 |
| 2015/0186800 A1* | 7/2015 | Kaplow | G06N 20/00 706/12 |
| 2015/0205782 A1* | 7/2015 | Subramanya | G06F 40/169 704/9 |
| 2016/0224939 A1* | 8/2016 | Chen | G06Q 10/06311 |
| 2016/0247110 A1* | 8/2016 | Sinha | G06Q 10/109 |
| 2016/0269337 A1 | 9/2016 | Blinder et al. | |
| 2016/0335572 A1* | 11/2016 | Bennett | G06Q 10/06311 |
| 2017/0013005 A1* | 1/2017 | Galula | H04L 63/20 |
| 2017/0085520 A1* | 3/2017 | Umapathy | G06Q 10/107 |
| 2017/0091717 A1* | 3/2017 | Chandraghatgi | H04L 67/36 |
| 2017/0236125 A1* | 8/2017 | Guise | G06Q 20/20 705/17 |
| 2017/0255489 A1* | 9/2017 | Abebe | G06F 9/505 |
| 2018/0004368 A1* | 1/2018 | Nishitani | G06F 16/287 |
| 2018/0129994 A1* | 5/2018 | Fowler | G06Q 10/06314 |
| 2019/0014070 A1* | 1/2019 | Mertvetsov | G06N 3/08 |
| 2019/0018687 A1* | 1/2019 | Falkenberg | G06F 9/485 |
| 2019/0044824 A1* | 2/2019 | Yadav | H04W 24/04 |
| 2019/0065033 A1* | 2/2019 | Kulkarni | G06F 3/04842 |
| 2019/0243956 A1* | 8/2019 | Sheets | G06F 21/32 |

OTHER PUBLICATIONS

Corston-Oliver, S., Ringger, E. & Gamon, M. et al. (2004). "Task-focused Summarization of Email". BYU Scholars Archive, All Faculty Publications. Paper 434.

* cited by examiner

COGNITIVE REQUEST MANAGEMENT

BACKGROUND

The present invention relates generally to a cognitive request management method. More particularly, but not by way of limitation, the present invention relates to a system, method, and computer program product to identify requests (including due date information), store requests, and integrate requests with users' calendars.

People in organizations ask other people to perform tasks and receive requests from other people for their own action. Sometimes, incoming requests must be delegated. Other times, the delegation is done after decomposition into a set of component subtasks. Managing all of these requests is difficult and stressful.

Conventional techniques only consider managing requests for a single user without considering the requests as an activity between two users. That is, request management always involves at least two people and always has implications for the work of other people that is not represented in the conventional task management techniques.

Therefore, there is needed a cognitive request management assistant that considers a social component and a request as a two-party action to identify requests (including due date information), store requests, and integrate requests with users' calendars.

SUMMARY

In an exemplary embodiment, the present invention can provide a computer-implemented cognitive request management method, the method including scanning a stream of incoming messages among at least two users to identify requests sent to a first user, storing the identified requests in a list of unfulfilled requests, identifying a response of the first user to the requests by backtracking within a message thread of the stream of incoming messages and when the response to a request is detected, the request is moved from the user's unfulfilled request list to a list of fulfilled requests, and displaying the list of unfulfilled requests and the list of fulfilled requests. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
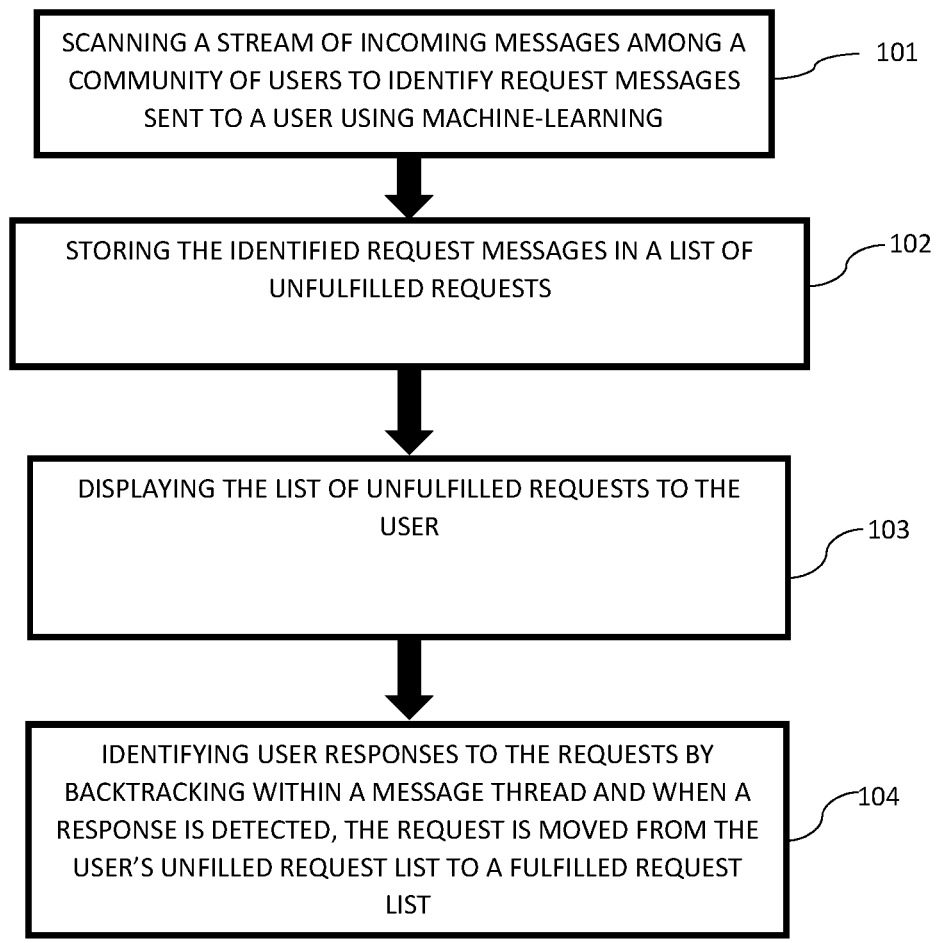
FIG. 1 exemplarily shows a high-level flow chart for a cognitive request management method 100 according to an embodiment of the present invention.

The invention will now be described with reference to FIGS. 1-4, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a cognitive request management method 100 according to the present invention can include various steps for displaying a list of pending requests for a user to fulfill and managing the list of requests.

With the use of various computing components, the method 100 may act in a more sophisticated and useful fashion, and in a cognitive manner while giving the impression of mental abilities and processes related to knowledge, attention, memory, judgment and evaluation, reasoning, and advanced computation. That is, a system is said to be "cognitive" if it possesses macro-scale properties—perception, goal-oriented behavior, learning/memory and action—that characterize systems (i.e., humans) that all agree are cognitive.

Cognitive states are defined as functions of measures of a user's total behavior collected over some period of time from at least one personal information collector (e.g., including musculoskeletal gestures, speech gestures, eye movements, internal physiological changes, measured by imaging circuits, microphones, physiological and kinematic sensors in a high dimensional measurement space, etc.) within a lower dimensional feature space. In one exemplary embodiment, certain feature extraction techniques are used for identifying certain cognitive and emotional traits. Specifically, the reduction of a set of behavioral measures over some period of time to a set of feature nodes and vectors, corresponding to the behavioral measures' representations in the lower dimensional feature space, is used to identify the emergence of a certain cognitive state(s) over that period of time. One or more exemplary embodiments use certain feature extraction techniques for identifying certain cognitive states. The relationship of one feature node to other similar nodes through edges in a graph corresponds to the temporal order of transitions from one set of measures and the feature nodes and vectors to another. Some connected subgraphs of the feature nodes are herein also defined as a "cognitive state". The present application also describes the analysis, categorization, and identification of these cognitive states further feature analysis of subgraphs, including dimensionality reduction of the subgraphs, for example graphical analysis, which extracts topological features and categorizes the resultant subgraph and its associated feature nodes and edges within a subgraph feature space.

Figure 2:
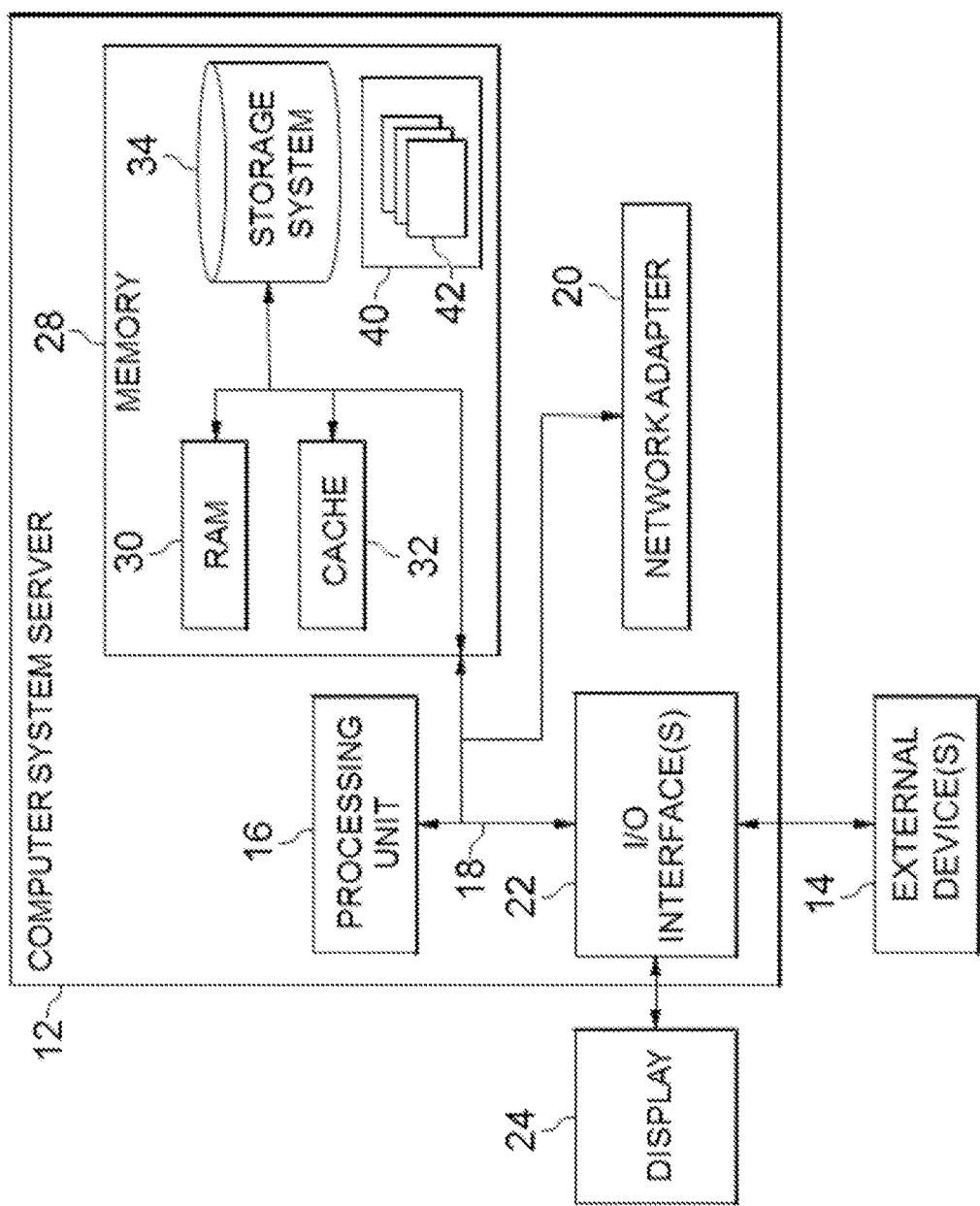
FIG. 2 depicts a cloud-computing node 10 according to an embodiment of the present invention.

By way of introduction of the example depicted in FIG. 2, one or more computers of a computer system 12 according to an embodiment of the present invention can include a memory 28 having instructions stored in a storage system to perform the steps of FIG. 1.

With reference generally to the invention, the invention may be applicable to any incoming stream of messages among a community of users. For each user, there can be as many as four lists of requests. These lists include, for a first user, who responds to requests from other users, there can be an unfulfilled request list, and a fulfilled request list. These lists refer to requests that are made to the first user. And, for a requesting user, there can be a pending requests list, and a completed requests list. These lists refer to requests that are made by the requesting user. Other lists may be used in addition to the mentioned ones above.

It is noted that although the invention is described below accorded to an e-mail request notification, the invention is not limited to e-mail requests.

The invention scans a first user's e-mail inbox to identify requests. Identifying requests may be performed with a well-tuned machine-learning solution, which depends on the words used to express and specify a request using machine-learning. Once a request has been identified, it is stored in a list of unfulfilled requests. This list can be displayed to the user upon need. A similar set of steps can be used in an outbox of the requesting user, to make a record in that user's pending requests list.

By further examination of the user's inbox and outbox, the invention may identify responses to requests through email thread management and analysis (e.g., the first user replies to a message from a requesting user) and additional machine-learning analyses based on the words used to respond to a request. When a response has been detected, then that request may be moved from the first user's unfulfilled request list to the first user's fulfilled request list. Correspondingly, for the requesting user, the request can be moved from the requesting user's pending request list, to that user's completed request list. In other words, a pending request is a request that the user has not yet completed.

Machine learning techniques can be used to enable an initial analysis of incoming messages as requests or non-requests. The invention can tune the machine learning analysis based on the user's responses to incoming messages (i.e., train the machine-learning model to learn the users' tendencies). If the analysis determines that a message is a request, but the user does not treat that message as a request, then it is a false positive, and the analysis should be re-run and refined with that new data (e.g., "learn" the user responses to train the model). In one embodiment, the invention can query the user and obtain enhanced training data. Rather than simply coding the message as a false positive, the invention can compute a request-likelihood score. If the score exceeds a criterion, then the invention can ask the user to determine if the message was (perhaps) an overlooked or forgotten request. If the user agrees that this was an overlooked request, then the invention can refine its method for recognizing requests. Similarly, if the user indicates that the message is not a request (i.e., it is a true false positive), then the invention can refine its method.

Correspondingly, if the analysis determines that a message is not a request, but the user treats the message as a request, then that is a false-negative, and again the analysis is re-run and refined with that new data.

Referring to FIG. 1, the method 100 for managing requests can include various steps to manage the requests. More specifically, in step 101, a stream of incoming messages among a community of users is scanned to identify request messages sent to a user using machine-learning. That is, step 101 identifies request messages sent to a first user.

The requests are identified as a request and from whom the request was sent. The invention considers a relationship between the requestor and requested user.

In one embodiment, the request messages can be identified and tagged with an importance factor according to a relationship between the requestor and the user receiving the request. An organization chart can be used to create a priority of completing requests based on who is sending the requests. For example, a request from the president of a corporation will be marked as most important and always appear at the top of the list whereas a request from a summer intern would have low importance and be at the bottom of the list. In this manner, the display (as discussed later) can be optimized according to an importance of the request based on a relationship between the requestor and the user receiving the request. Also, the invention can create multiple lists based on the relationships between the requestor and the user receiving the requests being in a different domain (e.g., work, family, friend, etc.). That is, a user can have a merged list that merges all requests whether they be related to work, from a family member, for a social occasion, etc. or have separate lists for each type of requestor.

In steps 102-103, the identified request messages are stored in a list of unfulfilled requests, where the list is displayed to the user. It is noted that the list can be displayed after the fulfilled list has been created in step 104. The user that receives the requests therefore can have displayed thereto a list of requests as either "fulfilled" or unfulfilled. Accordingly, the receiving user has an easily navigable graphical display that shows the user to which requests they need to attend.

Although the invention can be displayed graphically via a display device, the list of requests can also be dictated (i.e., audio file) to a user. For example, the list can be read to the user through an onboard audio system of a vehicle such that the user can drive and be kept up on their requests without having to remove their eyes from the road. In one embodiment, each request is played to the user via text-to-speech, such that the user can respond appropriately to each individual request. Optionally, a voice agent can take action based on the user's spoken instructions with regard to each request, or a collection of requests.

It is noted that in step 102, request parameters can be extracted from the request message to create a database of requests that may be indexed, sorted, etc. in terms of the request parameters inscribing a reminder for each request into the user's calendar.

In step 104, requests are identified as fulfilled or unfulfilled via navigating communications from the user. More specifically, in step 103, user responses to requests are identified by backtracking within a message thread and when a response is detected, the request is moved from the user's unfilled request list to a fulfilled request list.

It is noted that the invention also creates a list for sent requests and not just received requests. In one embodiment, the invention identifies sent request messages sent by a requesting user, stores the sent request messages in the requesting user's pending request list, and displays the pending request messages.

And, in both the requestor and the received requests, the invention can identify the user's responses to requests by backtracking within the thread (or more broadly in a set of messages between the user and other users), extracting distinctive features of requests into the user's request-profile, specifying a feature-similarity threshold, and identifying incoming messages whose feature-similarity with the request-profile exceed the feature-similarity threshold. The invention records user activity in response to a newly-identified request (i.e., a message whose feature-similarity exceeds the threshold), determines whether the user treated the newly-identified request as a request, and revises the user's request-profile and/or the feature similarity threshold, responsive to the step of determining. That is, the user's request profile and similarity-threshold is continually updated based on whether a user treats newly incoming messages as a request message or not. In other words, the method can train the model to learn how a user reacts to types of requests.

In one embodiment, the user that receives the requests can delegate the action out to a different user to fulfill the request. The invention can track the progress of the delegated requests and maintain the task on the users display list. For example, merely delegating a task does not necessarily complete a task. The method can learn whether the delegation of the task was a completion of the task, and if not, keep the request on the users unfulfilled request list until the user that was delegated the request completes the request.

In another embodiment, the priority of the request can be determined and then a targeted completion-time for responding can be specified. For example, the targeted completion-time can be specified based on the priority (e.g., high priority would be a faster completion-time).

Therefore, the method 100 may manage requests to a user and requests sent by a user, based on a relationship between the user and the requestor, to create an easy to use display or audio delivery of the fulfilled and unfulfilled requests. The invention can include identifying a request, placing the request into a list of pending requests, recording a pattern that can be used to detect a response to that request, comparing each successive message with the recorded pattern, responsive to the step of comparing, recognizing a response to the request, and responsive to the step of recognizing, moving the request from the list of pending requests, to a list of fulfilled requests.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 2, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set-top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 2, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, and removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive or flash drive (e.g., a USB "thumb" drive), and an optical disk drive for reading from or writing to a removable, non-volatile optical disk such as a CD-ROM, DVD-ROM or other optical media can be provided. In such instances, each can be connected to bus 18 by one or more interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing device, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 3:
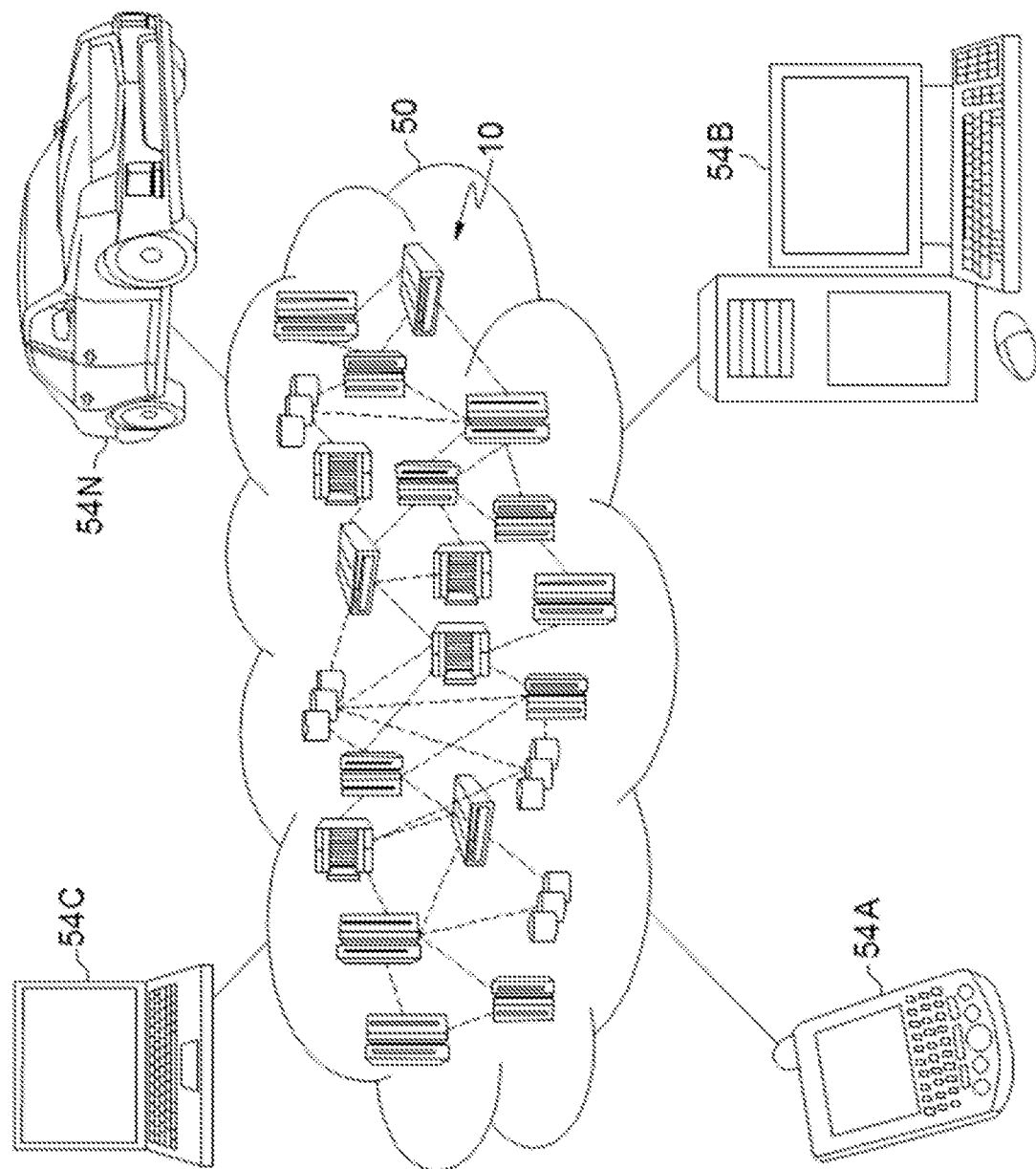
FIG. 3 depicts a cloud-computing environment 50 according to an embodiment of the present invention.

Referring now to FIG. 3, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources attached to a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
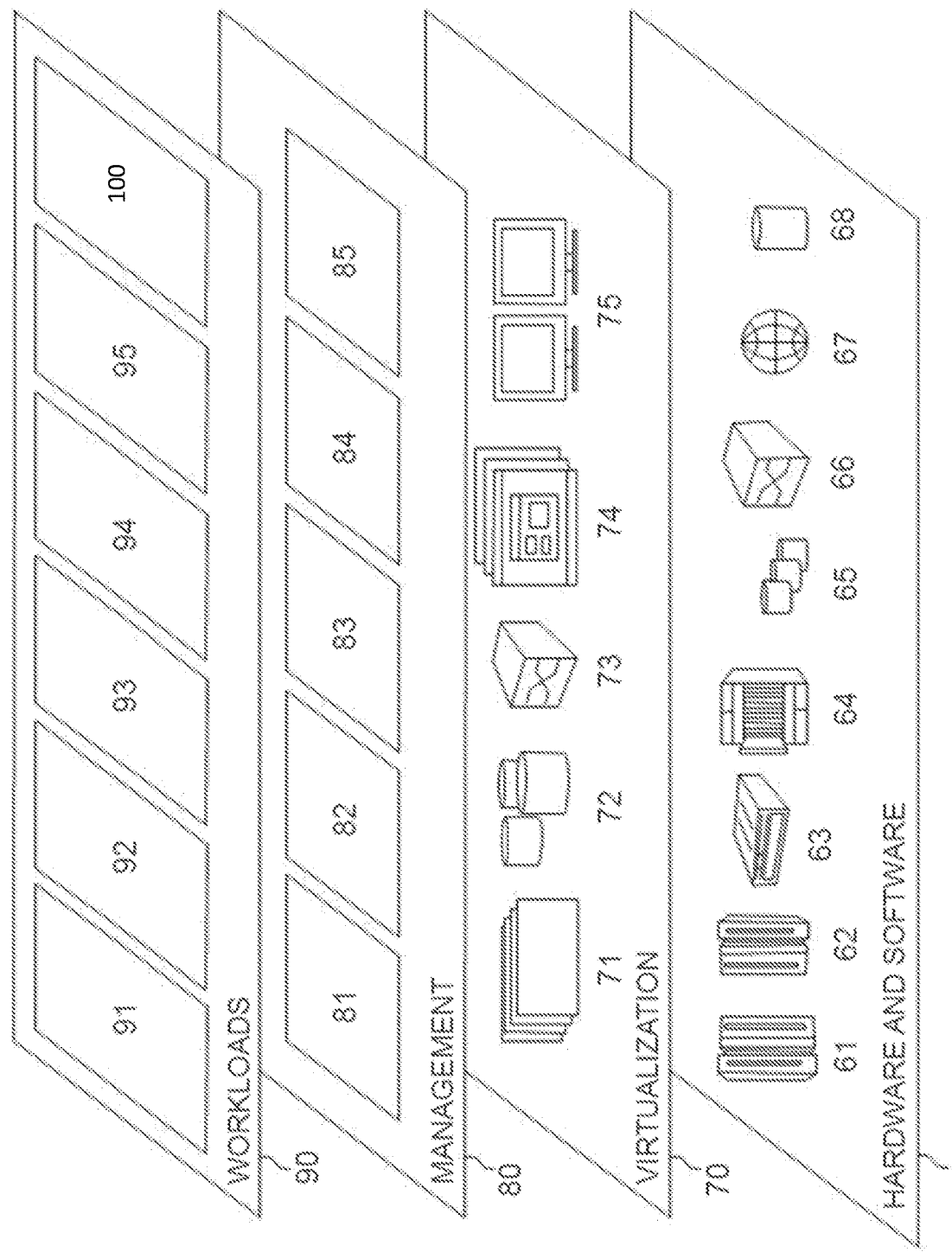
FIG. 4 depicts abstraction model layers according to an embodiment of the present invention.

Referring now to FIG. 4, an exemplary set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development lifecycle management 92; virtual classroom education delivery 93; data analytics processing 94; transaction processing 95; and cognitive request management method 100 in accordance with the present invention.

The present invention may be embodied as a system, a method, and/or a computer program product at any reasonable level of integration with workloads layer 90, management layer 80, virtualization layer 70, hardware and software layer 60, and cloud computing environment 50. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, or procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cognitive request management method, the method comprising:
    scanning, by a machine-learning model, a stream of incoming messages to identify a first request sent by a requestor, wherein the machine-learning model comprises a machine learning technique that enables an initial analysis of the stream of incoming messages as the request sent or a non-request category;
    storing, by the machine-learning model, the identified request in a list of unfulfilled requests and a list of pending requests;
    identifying, using the machine-learning model, a response to the first request by backtracking within a message thread of the stream of incoming messages and when the response to a request is detected, the request is moved from the unfulfilled request list to a list of fulfilled requests and from the pending request list to a list of completed requests for the requestor;
    displaying, via both a graphical user interface and a text-to-speech output from the graphical user interface, the list of unfulfilled requests, the list of fulfilled requests, the list of completed requests, and the list of pending requests; and
    performing an action, via a voice agent, based on a spoken instruction with regard to each request in the list of unfulfilled requests, the list of fulfilled requests, the list of completed requests, and the list of pending requests,
    wherein, if the identifying determines that a message is a request via the machine-learning model, but the message is not treated as a request by a receiver based on the receiver's response, then labeling the request as a false positive within the machine-learning model, and re-running and refining the identifying with that new labeling as the false positive to train the machine-learning model,
    further comprising tracking a delegation of the request for completion other than by the receiver of the first request, and
    wherein the displaying creates a mark noting the delegation of the request on the request in the list of unfulfilled requests and the list of fulfilled requests,
    further comprising:
        querying the receiver of first request to determine if the message not treated as the request was a mistake;
        when the receiver of first request indicated the mistake in response to the query, refining the machine-learning model further to automatically recognize the message as a request;
        extracting a distinctive feature of the request to a first request profile;
        specifying a feature-similarity threshold;
        identifying incoming messages whose feature-similarity with the request profile exceeds a feature-similarity threshold to confirm that the incoming messages includes a request; and
        revising the feature-similarity threshold based on if the identifying determines that the message is the request via the machine learning.

2. The computer-implemented method of claim 1, wherein the storing further comprises:
    extracting a request parameter from the request; and
    creating a database of requests that are indexed in terms of request parameters inscribing a reminder for each request into a calendar of the receiver of first request.

3. The computer-implemented method of claim 1, wherein the scanning further determines a relationship between the receiver of first request and the requestor,
wherein an importance factor is associated with the request based on the relationship, and
wherein the displaying displays the requests in an order of a value of the importance factor associated with the request on the list of unfulfilled requests and the list of fulfilled requests.

4. The computer implemented method of claim 1, wherein storing further includes:
determining a priority of the request; and
specifying a targeted completion-time for responding.

5. The computer implemented method of claim 1, wherein a progress of the delegated request is tracked and the task is maintained on the receiver display list.

6. The computer implemented method of claim 1, wherein the delegated request is displayed as an incomplete task.

7. The computer implemented method of claim 1, wherein the delegated request is displayed as a complete task when the delegator labels the delegation as a completion of the task.

8. A computer program product for cognitive request management, the computer program product comprising a non-transitory computer-readable storage medium having program instructions embodied therewith, the program instructions executable by a computer to cause the computer to perform:
scanning, by a machine-learning model, a stream of incoming messages to identify a first request sent by a requestor, wherein the machine-learning model comprises a machine learning technique that enables an initial analysis of the stream of incoming messages as the request sent or a non-request category;
storing, by the machine-learning model, the identified request in a list of unfulfilled requests and a list of pending requests;
identifying, using the machine-learning model, a response to the first request by backtracking within a message thread of the stream of incoming messages and when the response to a request is detected, the request is moved from the unfulfilled request list to a list of fulfilled requests and from the pending request list to a list of completed requests for the requestor;
displaying, via both a graphical user interface and a text-to-speech output from the graphical user interface, the list of unfulfilled requests, the list of fulfilled requests, the list of completed requests, and the list of pending requests; and
performing an action, via a voice agent, based on a spoken instruction with regard to each request in the list of unfulfilled requests, the list of fulfilled requests, the list of completed requests, and the list of pending requests,
wherein, if the identifying determines that a message is a request via the machine-learning model, but the message is not treated as a request by a receiver based on the receiver's response, then labeling the request as a false positive within the machine-learning model, and re-running and refining the identifying with that new labeling as the false positive to train the machine-learning model,
further comprising tracking a delegation of the request for completion other than by the receiver of the first request, and
wherein the displaying creates a mark noting the delegation of the request on the request in the list of unfulfilled requests and the list of fulfilled requests,
further comprising:
querying the receiver of first request to determine if the message not treated as the request was a mistake;
when the receiver of first request indicated the mistake in response to the query, refining the machine-learning model further to automatically recognize the message as a request;
extracting a distinctive feature of the request to a first request profile;
specifying a feature-similarity threshold;
identifying incoming messages whose feature-similarity with the request profile exceeds a feature-similarity threshold to confirm that the incoming messages includes a request; and
revising the feature-similarity threshold based on if the identifying determines that the message is the request via the machine learning.

9. The computer program product of claim 8, wherein the storing further comprises:
extracting a request parameter from the request; and
creating a database of requests that are indexed in terms of request parameters inscribing a reminder for each request into a calendar of the receiver of first request.

10. The computer program product of claim 8, wherein the scanning further determines a relationship between the receiver of first request and the requestor,
wherein an importance factor is associated with the request based on the relationship, and
wherein the displaying displays the requests in an order of a value of the importance factor associated with the request on the list of unfulfilled requests and the list of fulfilled requests.

11. A cognitive request management system, said system comprising:
a processor; and
a memory, the memory storing instructions to cause the processor to perform:
scanning, by a machine-learning model, a stream of incoming messages to identify a first request sent by a requestor, wherein the machine-learning model comprises a machine learning technique that enables an initial analysis of the stream of incoming messages as the request sent or a non-request category;
storing, by the machine-learning model, the identified request in a list of unfulfilled requests and a list of pending requests;
identifying, using the machine-learning model, a response to the first request by backtracking within a message thread of the stream of incoming messages and when the response to a request is detected, the request is moved from the unfulfilled request list to a list of fulfilled requests and from the pending request list to a list of completed requests for the requestor;
displaying, via both a graphical user interface and a text-to-speech output from the graphical user interface, the list of unfulfilled requests, the list of fulfilled requests, the list of completed requests, and the list of pending requests; and
performing an action, via a voice agent, based on a spoken instruction with regard to each request in the list of unfulfilled requests, the list of fulfilled requests, the list of completed requests, and the list of pending requests,
wherein, if the identifying determines that a message is a request via the machine-learning model, but the message is not treated as a request by a receiver based on the receiver's response, then labeling the request as a false positive within the machine-learning model, and re-running and refining the identifying with that new labeling as the false positive to train the machine-learning model, further comprising tracking a delegation of the request for completion other than by the receiver of the first request, and wherein the displaying creates a mark noting the delegation of the request on the request in the list of unfulfilled requests and the list of fulfilled requests, further comprising:
- querying the receiver of first request to determine if the message not treated as the request was a mistake;
- when the receiver of first request indicated the mistake in response to the query, refining the machine-learning model further to automatically recognize the message as a request;
- extracting a distinctive feature of the request to a first request profile;
- specifying a feature-similarity threshold;
- identifying incoming messages whose feature-similarity with the request profile exceeds a feature-similarity threshold to confirm that the incoming messages includes a request; and
- revising the feature-similarity threshold based on if the identifying determines that the message is the request via the machine learning.

12. The system of claim 11, embodied in a cloud-computing environment.

* * * * *